United States Patent [19]

Beesley et al.

[11] Patent Number: 5,020,051
[45] Date of Patent: May 28, 1991

[54] DUPLEX COMMUNICATIONS METHOD AND SYSTEM

[75] Inventors: Graham E. Beesley; David J. McCabe, both of Winchester, England; Jasjit S. Saini, Rosheim, France

[73] Assignee: Shaye Communications Limited, Hampshire, England

[21] Appl. No.: 451,749

[22] Filed: Dec. 18, 1989

[30] Foreign Application Priority Data

Dec. 20, 1988 [GB] United Kingdom ................ 8829661

[51] Int. Cl.⁵ .............................................. H04B 1/56
[52] U.S. Cl. ........................................ 370/29; 370/24
[58] Field of Search ................. 370/29, 100.1, 24, 32, 370/77; 455/53

[56] References Cited

U.S. PATENT DOCUMENTS

| | | | |
|---|---|---|---|
| 4,034,295 | 7/1977 | Kotezawa et al. | 370/29 |
| 4,062,016 | 12/1977 | Kotezawa et al. | 370/29 |
| 4,467,473 | 8/1984 | Arnon et al. | 370/105.1 |
| 4,472,799 | 4/1984 | Fossati et al. | 370/29 |
| 4,525,835 | 6/1985 | Vance et al. | 370/29 |
| 4,637,016 | 1/1987 | Ciancibello | 370/29 X |
| 4,644,524 | 2/1987 | Emery | 370/29 |
| 4,750,169 | 6/1988 | Carse et al. | 370/29 X |
| 4,754,450 | 6/1988 | Lynk et al. | 370/29 |
| 4,841,521 | 6/1989 | Amada et al. | 370/29 X |

FOREIGN PATENT DOCUMENTS 2196514  4/1988  United Kingdom ................ 370/29

Primary Examiner—Douglas W. Olms
Assistant Examiner—H. Kizou
Attorney, Agent, or Firm—Wenderoth, Lind & Ponack

[57] ABSTRACT

A method of establishing a digital time-division duplex radio communication link between one of a plurality of portable units and a base unit in a cordless telephone system, transmissions from the base unit are allowed only on a ping-pong basis with transmission bursts from all the active transmitters in the base unit being synchronized with one another. This prevents blocking of receiver sections due to co-sited transmitters transmitting at the same time on a different channel. The difficulty of synchronizing the transmission bursts of the active portable units with their respective transceivers within the base unit is overcome by allowing the portable unit to make an initial continuous call comprising multiple identical sequences of data containing units small enough to be completely received within the limited reception windows of the base unit. After the initial call has started communication, an exchange of signals takes place on a ping-pong basis to establish synchronism between the portable unit and base unit. Finally, if all is well, the system reverts to a speech mode in which voice signals rather than data signals are exchanged between the portable unit and base unit.

21 Claims, 8 Drawing Sheets

DUPLEX COMMUNICATIONS METHOD AND SYSTEM

BACKGROUND OF THE INVENTION

The present invention relates to duplex communications systems, and to a method of establishing a digital time-division duplex radio communication link between one of a plurality of portable units and a base unit forming a cordless telephone system. The invention is directed particularly at the signalling protocol used in establishing the radio link from one of the portable units to the base unit, or vice versa.

Such a system is shown, in its simplest form, in FIG. 1 of the accompanying drawings to which reference will now be made. The system illustrated comprises a fixed part in the form of a base unit 1, and two portable units in the form of respective handsets 2, 3. Each handset comprises an earpiece, microphone and keypad, this latter being shown diagramatically under reference 4. In addition, each handset contains a respective radio transmitter/receiver (transceiver) and associated antenna 6, 7 by which the handsets may communicate with the base unit by radio, as represented by the dotted lines 8, 9. The base unit likewise contains a number of transceivers at least equal to the number of handsets, together with an antenna 5 for transmission and reception of radio signals from the handsets. The handsets may communicate with each other, but only via the base unit. The base unit also includes a hard-wired connection 10 to the external telephone system, and contains interface circuitry for interfacing the base unit transceiver to the external telephone line. Although only two handsets are shown, this is to be taken as an example of the simplest system and many more handsets, up to the capacity of the system, may be provided.

The present invent on is concerned with systems of the type illustrated in FIG. 1, in which the speech and other information to be transmitted between the base unit and the handsets s digitally encoded before transmission, is transmitted as a digital signal, and is decoded after reception to reproduce the original. A limited number of radio channels are allocated for the radio links 8, 9 and it is clearly therefore preferable to utilise the same channel for both ends of a radio link—i.e. duplex communication. Each transceiver in the system will be able to transmit and receive on a number of these channels, if not all.

In digital second generation (CT2) cordless telephone systems, burst mode duplex is used to provide full duplex speech on a single channel. This essentially means that each transmitter has to compress the encoded speech from a particular time interval called the burst period) down to just under half that interval (called the burst duration) in order to transmit the encoded speech and have time to receive the returning encoded speech in the other half of the burst period. This action is commonly called a ping-pong transmssion mode. It should be noted that the encoded speech corresponds to the speech from the entire burst period and on reception is expanded to its normal representation as continuous speech.

In order to provide a base unit capable of sustaining communication with a number of portable units it is desirable to synchronise the transmission bursts of the base unit. If this is not done, the phenomenon known as blocking can occur where a receiver which is trying to receive is sited close to a transmitter which is transmitting at the same time. This design goal of base burst synchronism and the use of the base unit as the synchronism master in burst mode duplex communication with a portable unit raises a problem. The problem is how a portable unit which cannot sense the burst synchronism of a target base unit can establish communication with that base unit as the base unit can only receive in predetermined burst windows.

SUMMARY OF THE INVENTION

In accordance with the present invention, there is provided a method of establishing a digital time-division duplex radio communication link between one of a plurality of portable units and a base unit forming a cordless telephone system, said radio link being normally effected by a ping-pong format comprising alternate bursts of transmitted signal and reception with one end of the link transmitting while the other 15 is receiving, and wherein the base unit includes a number of transceivers at least equal to the number of portable units and each portable unit includes a transceiver whereby the aforesaid radio link may be established, said method comprising synchronising the transmission bursts from each of the active base transceivers so that they all have the same start time and burst duration and defining, between successive synchronised transmission bursts, a reception window during which the base unit transceivers are in reception mode to listen for signals from the portable units.

In order to establish communication between each portable unit and the base unit, each portable unit is allowed to make a continuous transmission call which consists of multiple, for example 6, repeats of identity data and synchronising/calling data arranged in sufficiently small units so that the base unit which, for any one channel, can only receive in the narrow window dictated by the bursts synchronizer in the base unit, can see a whole transmission unit intact. These multiple repeating transmissions are called phases and the base unit will detect a particular phase and stay locked for as long as the clock difference between the portable unit and base unit allows. If phase lock between the portable unit and base unit is lost before the portable unit has completed its transmission, then the base unit will find and lock onto the next phase that moves into its reception window.

At the end of the transmission call from the portable unit, the base unit is permitted to respond (provided it has correctly identified the portable identity data or other authentication information) but has to be restricted to the burst mode format and is thus restricted to transmitting in burst synchronism with any other active transmitter within the base unit. The portable unit then has to find the response from the base unit. This s achieved by the base unit transmitting synchronising words and data rapidly so that the portable unit can find and lock to the synchronising words and so achieve phase lock with the transmission bursts from the base unit.

When this response has been correctly received by a portable unit and identified as intended for that portable unit, the portable unit can transmit back to the base unit in burst synchronism with the transmitted bursts of the base unit. This requires a predetermined timing offset between the reception at the portable unit of a base transmission burst and the transmission burst of the portable unit. This must begin in such a way as to allow the base unit receiver to be made ready to receive following its transmission and must end before the base unit, and any other base unit synchronised therewith, needs to transmit again. These transitional timing requirements are the reason the burst duration must be less than half the burst period.

The return transmission from the portable unit to the base unit is used to confirm the correct reception of the base unit burst transmission at the portable unit, to indicate the existence of burst and bit synchronism and to complete the authentication as required prior to moving to the speech mode. The base unit, on fully recognizing the burst transmission from the portable unit and establishing that the units are communicating effectively n this mode signals the change to the speech mode.

The speech mode is still constrained by the need to maintain burst synchronism but must allow most of the bandwidth to be used for speech and so uses a low data rate for message exchange and identity and communication integrity checking.

It will be seen that, broadly speaking, there are three distinct stages to the setting-up and execution of a call from a portable unit: the initial continuous call from one of the portable units to the base unit; the interchange on a ping-pong time scale between the base unit and the portable unit during which, inter alia, synchronism of the portable unit to the base unit is effected, and the speech mode itself. Each of these stages is realised with a distinct and different transmitted signal pattern sent between the units. These signal patterns are known as data multiplexes. The main mode (speech mode) with its very low data transmission rate and high speech bandwidth is called multiplex 1 (or MUX1). The burst mode interchange between the base unit and portable unit which has full bandwidth for data and synchronizers is called multiplex 2 (or MUX2) and is used for call setup or recovery of failing radio links. The multiphase continuous transmission used by the portable unit to call the base unit is called multiplex 3 (or MUX3).

BRIEF DESCRIPTION OF THE DRAWINGS

These three multiplexes will now be described in more detail with reference to FIGS. 2 to 5 of the accompanying drawings in which:

FIG. 2 shows the type of ping-pong transmission used in the method of the present invention; FIG. 3 shows the multiple repeat mode of the present invention. A and I refer to synchronising calling and identity respectively and in FIG. 3, 6 A digital data words will be seen to repeat with 6 I digital data words. A and I are the inverse of A and I respectively and are transmitted in order to keep the data symmetric about DC.

Figure 1:
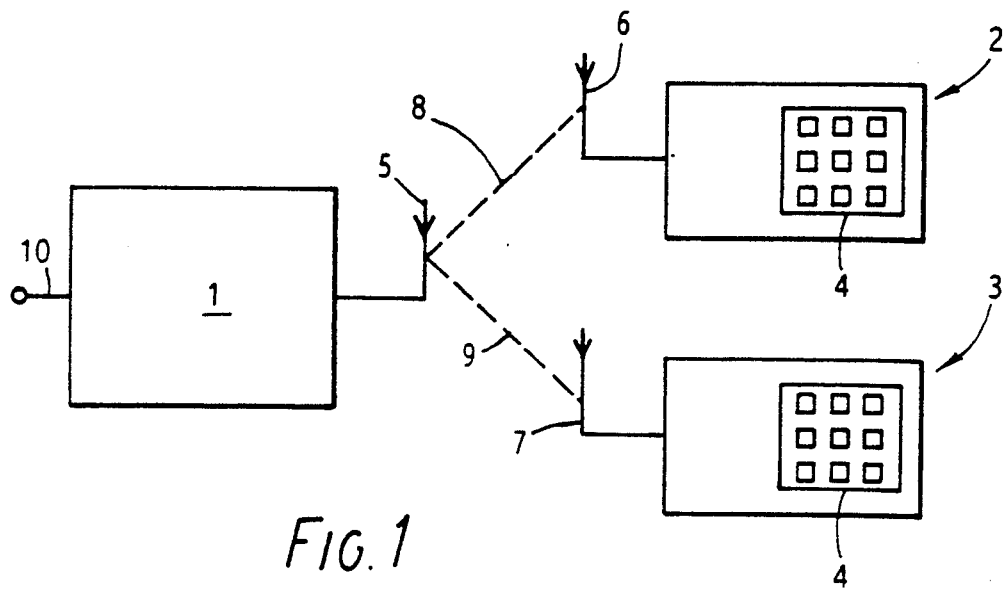
FIG. 1 shows an overall system of the present invention.
Figures 6, 7:
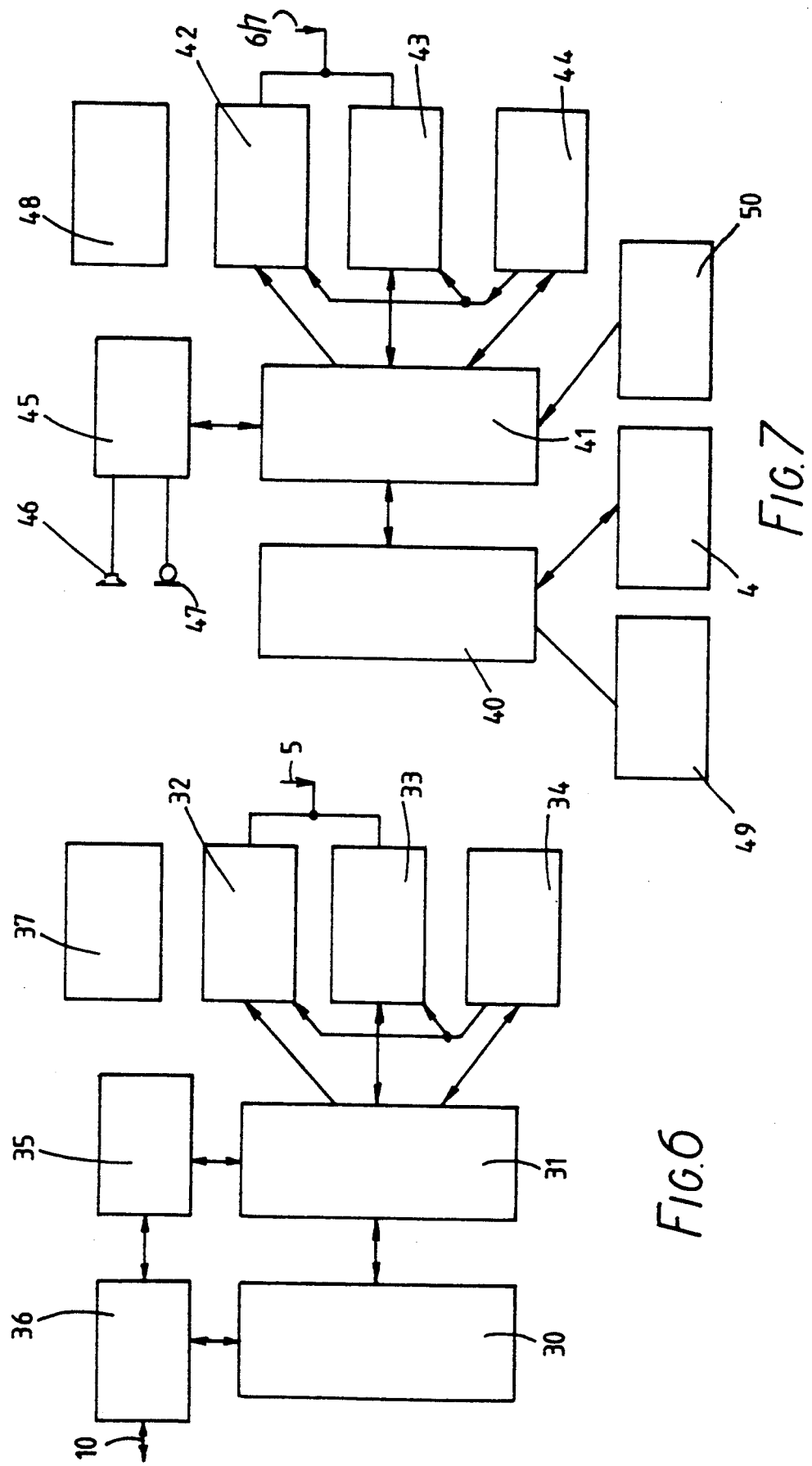
Figure 8:
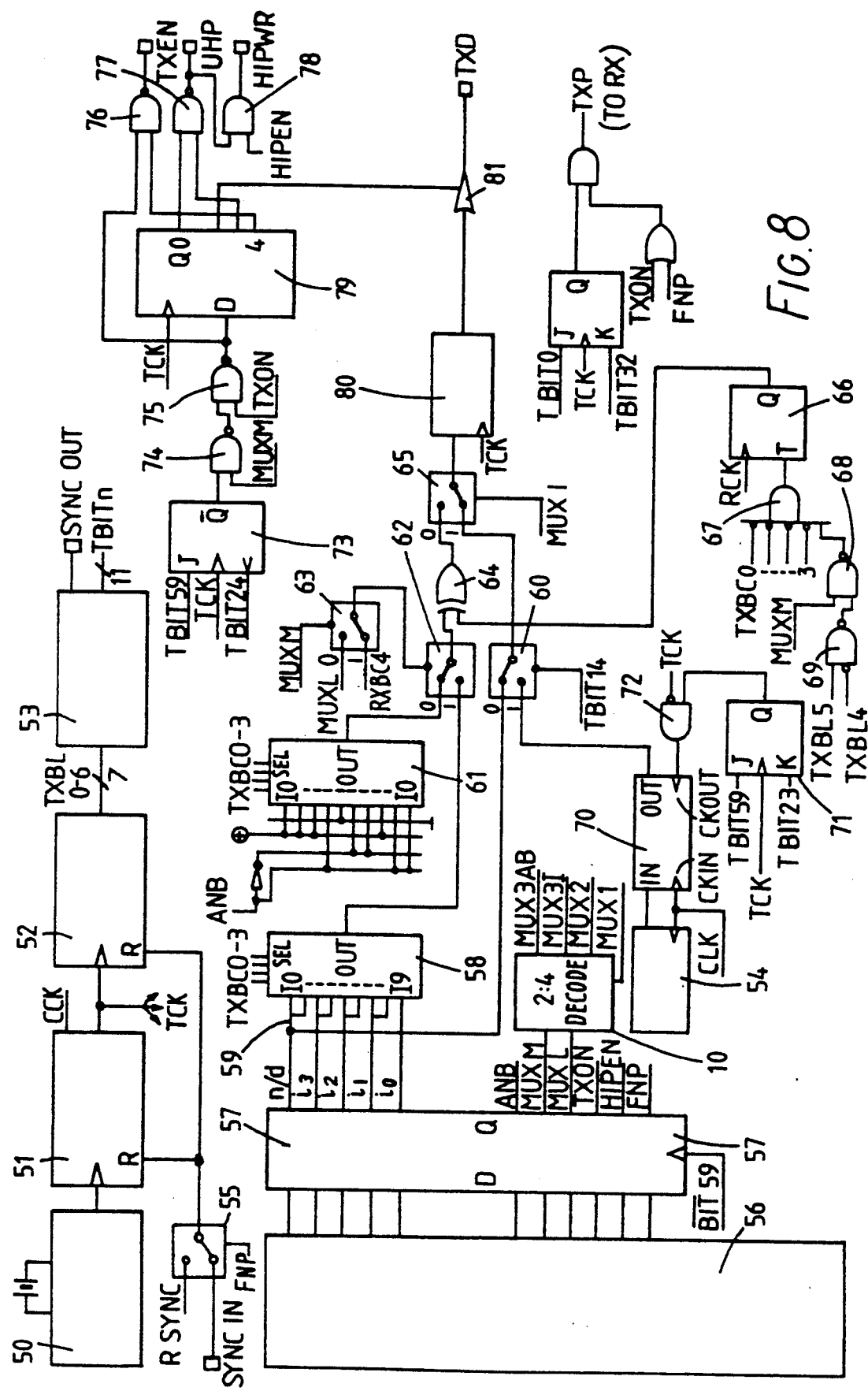
Figure 9:
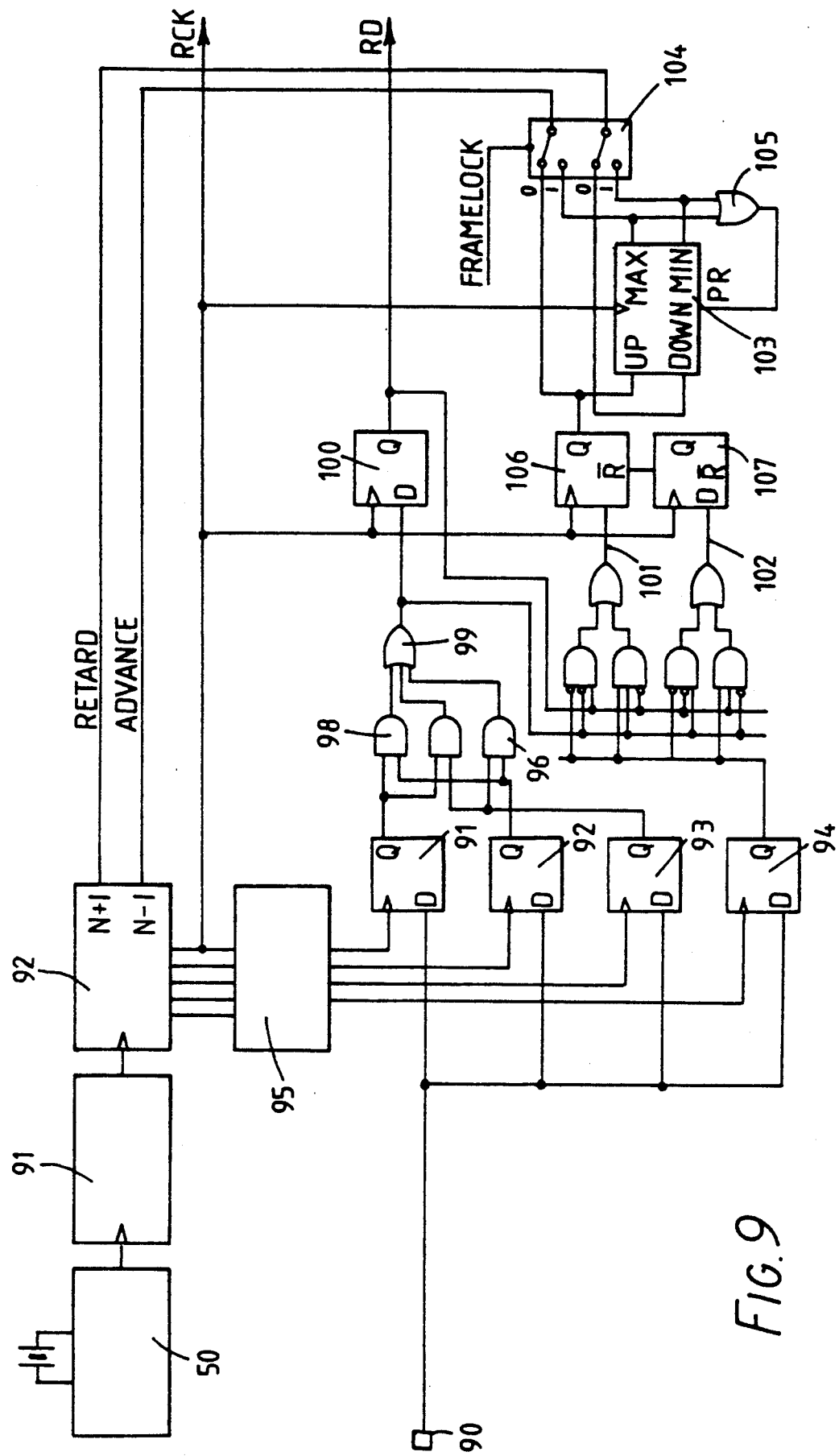
Figure 10:
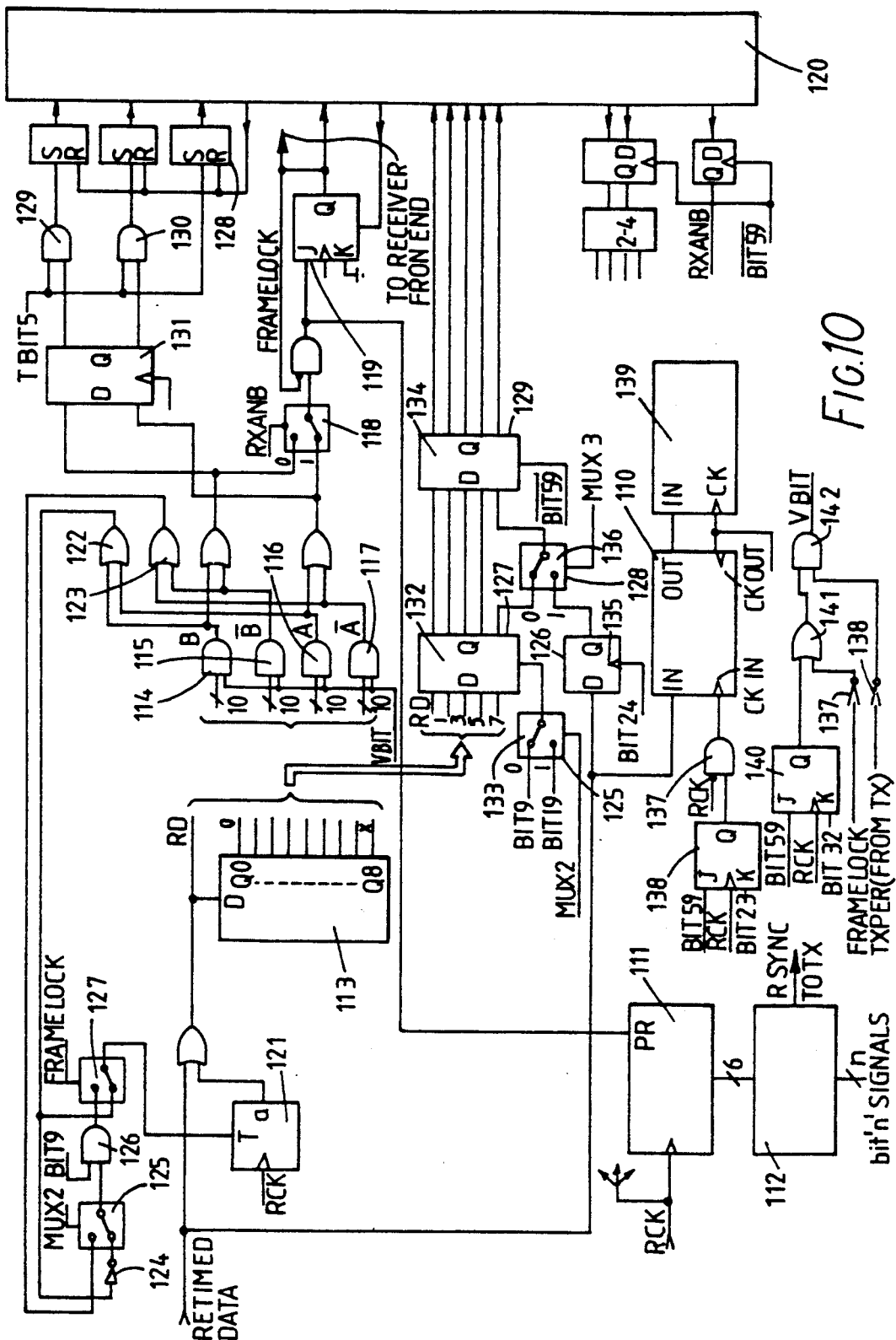

Following the description of the multiplexes, there will be described, by way of example only, the detailed circuitry used to obtain the signals exchanged between the base unit and portable units. In this connection, reference will be made to FIGS. 6 to 10 of the accompanying drawings in which:

FIG. 6 is a block diagram of the base unit of FIG. 1;
FIG. 7 is a block diagram of an exemplary portable unit 2, 3 from FIG. 1;
FIG. 8 is a circuit diagram of the transmitter forming part of the base unit and portable unit circuitry: and
FIGS. 9 and 10 are circuit diagrams showing the front end and the back end respectively of the receiver forming part of the base unit and portable unit circuitry.

DESCRIPTION OF THE PREFERRED EMBODIMENT

Figure 2:
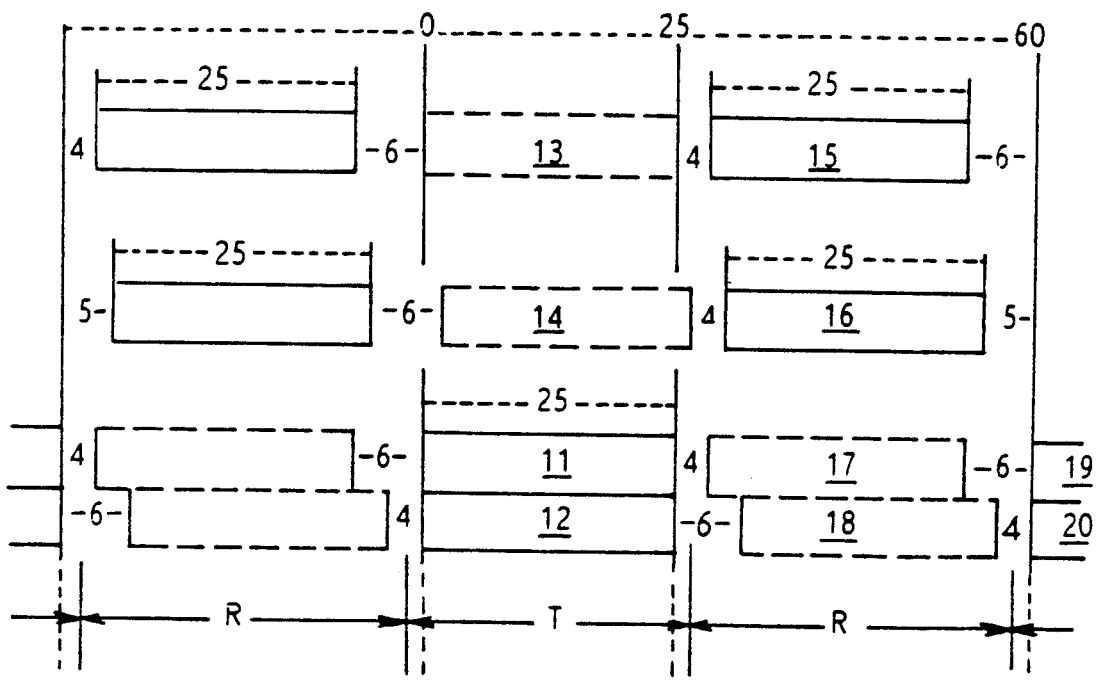
FIGS. 2 and 3 show a series of timing diagrams within a common time frame and showing blocks of transmitted (TX) and received (RX) data to and from two portable units and a base unit. The horizontal. timescale s measured in bits, each of 12.5 $\mu$s duration.

The ping-pong transmission system of FIG. 2 will now be explained in more detail. Each of the rectangular time blocks represents a sub-frame of either transmission or a reception period; those blocks whose horizontal sides are dotted represent reception; solid lines represent transmission sub-frames. As already explained, transmission and reception as between the base unit and each portable unit is by way of alternate transmission and reception. Thus, at any one instant of time, one end of the radio link will be transmitting, while the other receives. At the end of the transmission burst, the process reverses, with said one end of the radio link receiving, while the other end transmits. By way of example, FIG. 2 shows the communication of the base unit 1 of FIG. 1 with each of two portable units 2, 3. In the period from 0 to 25 bits (312.5 $\mu$S , the base unit makes two transmissions 11, 12 from its respective transceivers which are received by the portable unit 2 in time block 13 and by the portable unit 3 in time block 14. It will be noted that the transmission to portable unit 2 is received substantially simultaneously with its transmission from the base unit; however, portable unit 3 which is further away suffers a noticeable delay—of perhaps 1 bit duration—before reception commences. This means that reception block i3 is staggered in relation to reception block 14, with block 14 starting and ending 1 bit later. The transceivers have a built in delay between reception and transmission to allow the circuits to recover from one mode, and build up to the next. At the close of reception from the base units, each of the portable units 2, 3 awaits a fixed period—typically 4 bit durations, as illustrated—before making its return transmission, represented by the time blocks 15, 16 respectively to the base unit 1. These transmission bursts, like those of the base unit, are of 25 bits duration, as shown. The transmission burst 15 from portable unit 2 is received at the base unit 1 substantially simultaneously, as before. The reception at the base unit 1 from portable unit 2 is represented by time block 17. The transmission burst 16 from portable unit 3 is once again delayed by 1 bit duration, due to the greater transmission distance. The reception at the base unit 1 from portable unit 3 is represented by time block 18, and it will be noted that this is now. delayed by a total of 2 bits with respect to block 17. With normal ping-pong communication, the base unit, after a short delay, now transmits back to the two portable units a further two blocks of data. It will be seen that, as time progresses, the delay between the transmissions to and from the closer portable unit 2 and those to and from the portable unit 3 will increase, and the time will eventually come when the base unit is trying to transmit on one channel at the same time as it is trying to receive on another. This will almost inevitably result in blocking of that transceiver which is trying to receive, due to the large signals from the immediately adjacent transmitter.

In the present invention, this problem is overcome by synchronising the base unit transmission bursts to the respective portable units. Thus, referring to FIG. 2, it will be seen that the two transmission bursts represented by time blocks 11 and 12 have identical start and finish times. The next adjacent transmissions from the base unit are represented by time blocks 19, 20 (shown partly in FIG. 2) and are spaced a fixed time duration from the transmission time blocks 11 and 12. The interval between the blocks 11, 12 and the blocks 19, 20 is mainly occupied by a reception window R. During this time, the base unit transceivers are all switched to reception mode to listen for signals from the portable units 2, 3. Because the base unit transmissions are all synchronised, this reception window may be of fixed length, and may occupy the whole of the period between the synchronised transmission bursts, less the aformentioned short delays at each end to give chance for the circuitry to change from one mode to the other. As a consequence of the above arrangement, it will be noted that, whereas the delay between reception and transmission in the transceivers of the portable units is fixed (in the above example, 4 bits), in the base unit, the corresponding period is not fixed, but varies in accordance with the time at which each transmission is received by the base unit (compare the 6-bit and 4-bit durations after the close of the reception time blocks 17 and 18, before the next transmission bursts 19, 20).

The arrangement is such that the reception window is sufficiently long to contain the transmission bursts from the portable units, plus a little to cater for delays in transmission such as illustrated in FIG. 2. Clearly this means that the range of the apparatus is limited by the maximum delay which can be tolerated within the fixed reception window, but this is not reckoned in practice to unduly limit the utility of the system. In a typical system, such as illustrated in FIG. 2, the duration between adjacent transmission bursts is 35 bits, and the typical window duration will be a little less than this—say 31 bits.

In practice, the base unit transmission bursts are synchronised by a clock within the base unit. As already explained, a problem arises in establishing a call from a particular portable unit 2 or 3 to the base unit 1 when the base unit 1 is only open for reception during discrete reception windows of limited length. This is achieved, in the present invention, by the aforementioned signal patterns MUX2 and MUX3. MUX3 is the initial call up from the portable unit, while MUX2 establishes the call and in particular synchronises the operation of the portable unit with that of the base unit. Once the call is set up, the call proper may commence (MUX3). The MUX1 and MUX2 signal patterns are contained within the fixed ping-pong frame reference—i.e, in the example given, 25 bits long with a 60 bit burst period. The calling signal pattern, MUX3, is not contained within the ping-pong frame, as will now be explained.

(i) Initial Call From Portable Unit (MUX3)

Figure 3:
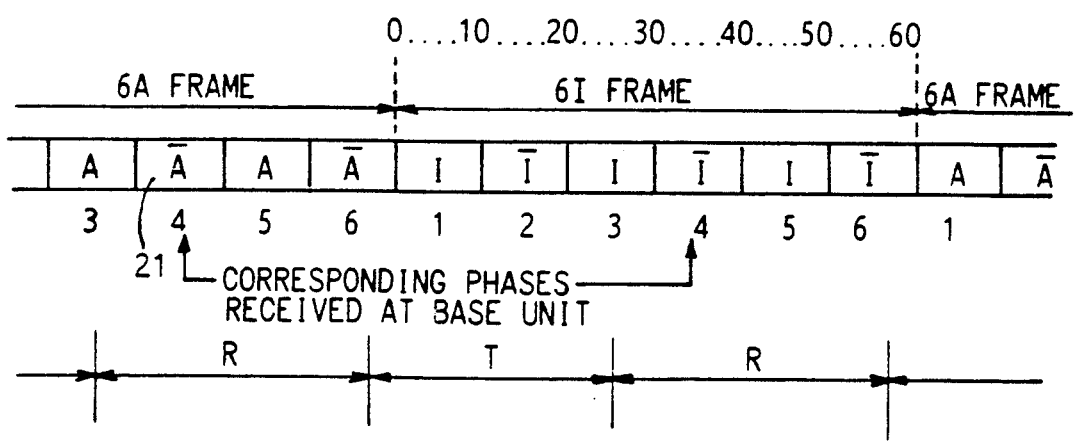
Figure 4:
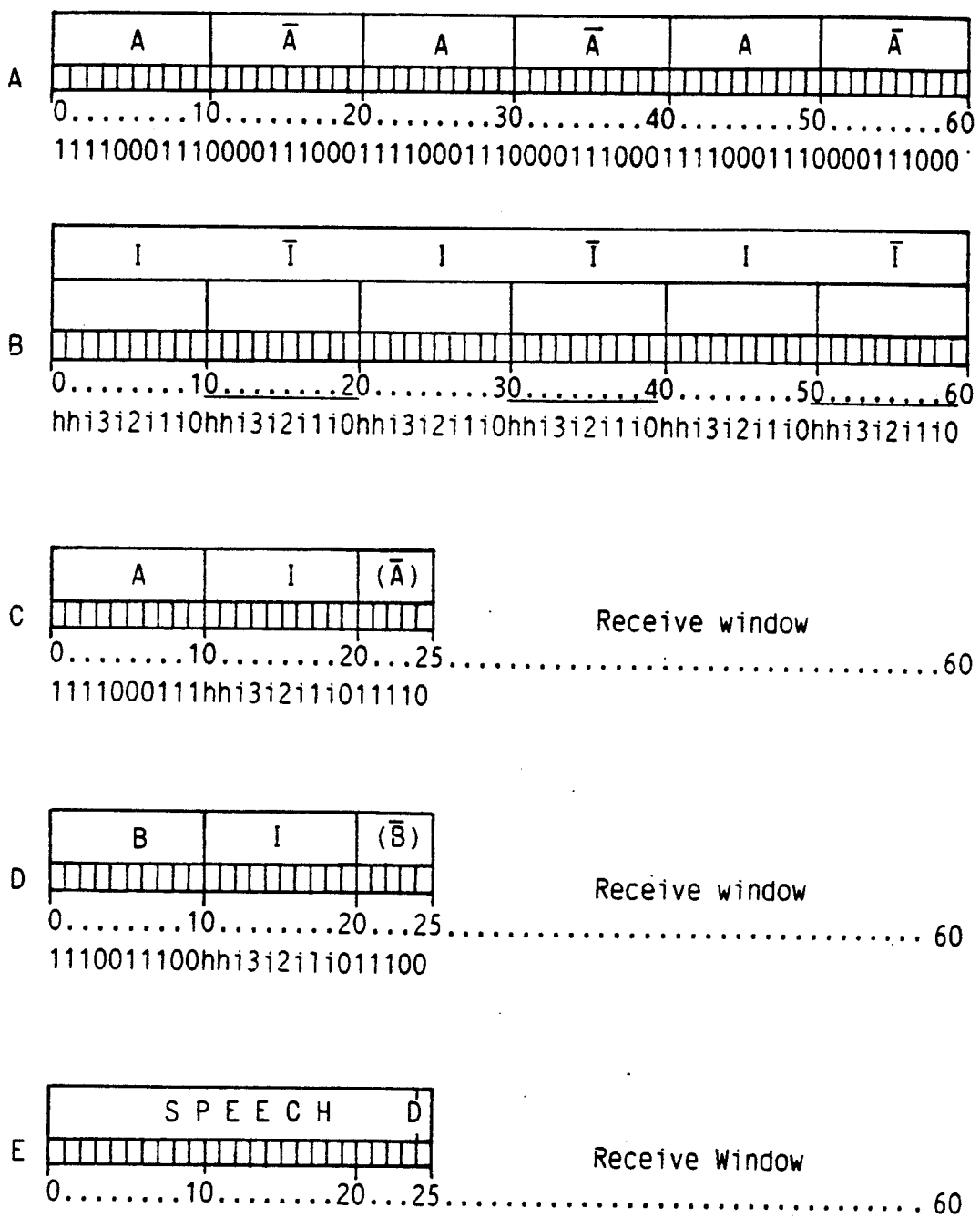
FIGS. 4A-4E are a series of timing diagrams, on a larger scale than FIG. 1, and showing the bit contents of the digital data words within each frame. In these diagrams, h refers to header bits; i0, i1, i2, etc. to individual bits making up the identity word. Note that the h and i bits are transmitted in identical pairs which slows down transmission speed, but improves reliability.

This is a continuous call transmiss on using a 60 bit (750 μS) frame size, with multiple repeat sub-frames to allow the base unit, with its fixed receive window, to receive corresponding phases of the transmission. Referring to FIGS. 3 and 4 of the accompanying drawings, it will be seen that two types of frames are transmitted alternately:

a first frame, referred to herein as a 6 A frame, which comprises six sub-frames each containing a 10-bit A word representing synchronising and calling information. As mentioned above alternate A-words are inverted (A, $\overline{A}$, A, $\overline{A}$ etc). A full 6 A frame is illustrated in FIG. 4A;

a second frame, referred to herein as a 6 I frame, which comprises six sub-frames each containing a 10-bit I word representing information as to the identity of the particular portable unit making the call. As before, alternate 1-words are inverted (I, $\overline{I}$, I, $\overline{I}$ etc). A full 6 I frame is illustrated in FIG. 4B.

The full call transmission from the portable unit comprises a plurality of alternating 6 A, 6 I frames. Typically, a total of 60 sequences, each comprising 7 alternating 6 A, 6 I frames, will be transmitted. Each sequence is $7 \times 2 \times 60 = 840$ bits (10.5 mS) long. Meanwhile, the transceivers in the base unit are cycling around the available radio channels listening, in their respective reception windows, for calls from the associated portable units. The base unit receiver is looking for the calling information in the form of the A-word contained within each sub-frame of the full 6 A frame. It will be noted that each 6 A word is of a length (10 bits) that may be fully received within the reception window of the base unit. Reception by the base unit of a full A-word within a 6 A frame tells the base unit that one of the portable units is about to establish a call. In brief, having received the A-word, the base unit then establishes the identity of the portable unit, using the 6 I frames, and thence reverts to ping-pong mode to set up the communication parameters and finally to establish the call itself.

Particular reference is now made to FIG. 4B, in order to explain in more detail the contents of the 6 I frame. Each 10-bit word of the 6 I frame comprises five pairs of bits. The bits in each pair are identical. The first identical pair of bits in each word comprises the header bits h which are used to identify which particular identity bits follow; the final four pairs of identical bits: i 3, i 2, i 1 and i 0 comprise a four-bit code which is peculiar to the particular portable unit, and is thus able to identify that unit to the base unit. The full identity code is not, however, contained within a single I word, but in a plurality—in this case, seven—of 6 I words. To this end, the first 6 I frame contains a set header bit and the four most significant bits (MSBs) of the identity code (ID). The subsequent 6 I frames contain a reset header bit and the subsequent ID bits sent, as already mentioned, in groups of 4 bits (1 nibble) each. The whole identity code is thus $4 \times 7 = 28$ bits long. Of these, 22 bits are used for identification, as already mentioned, giving approximately 4 million combinations, and the remaining 6 bits are used for miscellaneous signalling information, such as the hook state of the portable unit.

As the call transmission from the portable unit proceeds, the 6 I frames which are transmitted alternately with the 6 A frames cycle through the 7 groups of 4 bits of identity information, with the 6 I frame containing the most significant bits being transmitted first in each cycle, followed by the lesser order bits in diminishing order of significance. Thus, in each transmitted sequence of seven alternate 6 A, 6 I frames, the full 28-bit identity information is sent.

As already mentioned, this sequence of seven alternate 6 A, 6 I frames is repeated 60 times, starting with a 6 A frame and ending, at the sixtieth sequence, with an I frame. A 61 st sequence is then transmitted which is the same as sequences 1 to 60, but in which the 6 I frames are replaced by 6 A frames. The full call transmission made by the portable unit is thus $61 \times 840 = 51240$ bits (640.5 mS) long.

The manner in which the base unit receives and then interprets this call signal from the portable unit will now be explained with particular reference to FIG. 3. FIG. 3 is set to the same time scale as FIG. 2 and, in particular, it should be noted that the base unit is only able to receive during reception windows of fixed spacing and duration, dictated by the ping-pong transmission system. For convenience, these reception windows are reproduced in FIG. 3 under the references R, as before. The periods between the reception windows R, designated T, are periods during which the base unit may make its own transmission.

FIG. 2 shows a section of the transmission call from a portable unit 2 or 3. The drawing shows the closing 4 sub-frames of a 6 A frame, followed by a full 6 I frame, followed by the opening 2 sub-frames of the next following 6 A frame. All of the 6 A frames are identical.

As already mentioned, the unused transceivers within the base unit are constantly cycling round the available channels listening, in their reception windows R, for a transmission call from a portable unit. The transceivers are programmed to look for the calling word A contained within one of the 6 A frames. Once the base unit has fully received and understood a particular A word, it will then, in its next subsequent reception window, look for an I word in the corresponding position in the 6 I frame which follows. To this end, it will be noted that the repeat period of the alternate 6 A, 6 I frames (60 bits) is the same as the ping-pong burst period which controls the spacing of the reception windows. This is illustrated in FIG. 3 where, by way of example it is assumed that the base unit first fully receives the A word referenced 21, which is number 4 in the reducing sequence of words within each frame. This is received in the leftmost window R. In the next reception window R, the rightmost in FIG. 3, the base unit now looks for the correspondingly positioned I-word in the subsequent 6 I frame. This is the I word referenced 22 within the 6 I frame. Having established communication, the base unit needs to receive a full sequence of seven 6 I frames in order to obtain the full 28 bit identity information. This is obtained one I word at a time in the subsequent reception windows. Having received the full identity information, the base unit now waits for the end of the transmission call from the portable unit, which is signalled by the 61 st sequence, comprising only 6 A words. The base unit is thus looking for two A words in subsequent reception windows. As soon as it receives these, the base unit knows that the transmission call is at an end, and the next pattern of signals, MUX2, commences. Thus far, the base unit has not made any transmission to the portable unit.

(ii) Base Unit response to portable unit initial call (MUX2)

The response call from the base unit back to the portable unit consists of 25-bit AI frames in ping-pong format (750 μs period). Each AI frame is made up from an A sub-frame, an I sub-frame and the first 5 bits of an A sub-frame inverted (see FIG. 4C). The A sub-frame contains an A-word identical to that transmitted by the portable unit. The I sub-frame contains an I word having identity information in the same format as the I words transmitted by the portable unit. The identify information received from the portable unit during MUX3 is stored by the base unit, and transmitted back to the portable unit in the I words of the AI frames. To this end, a sequence of 25 bit AI frames are transmitted back to the portabLe unit, with the I word part of the frame being sequenced through the 7 ID nibbles. Each AI frame is transmitted twice, the second time inverted. The sequence of 7 is repeated five times, as will now be explained. The final five bits of each AI frame are stuffer bits, to make up the 25 bit long transmission burst, and are not used. Meanwhile the portable unit which sent the transmission call is listening for a transmission from the base unit so that synchronism between the two can be established.

During the first two sequences of 7 AI frames sent by the base unit, the portable unit does not transmit. During the first sequence, the portable unit uses the received A words to establish bit and word synchronism for its circuits with the transmissions from the base unit. This enables the portable unit to correctly receive the header bits at the beginning of the I word part of the first of the AI frames sent during the second sequence—i.e. the MSB of the identity information. These and the subsequent identity bits sent by the base unit are checked by the portable unit for correctness and, if all is well, the portable unit will make its first transmission burst back to the base unit after the end of the second sequence of AI frames from the base unit, but before the third sequence commences.

(iii) Portable unit Response to Base unit Call (MUX2)

The portable unit's response to a base unit call is the transmission back to the base unit, and within the portable unit's transmit frame reference, of the same AI frame sequences just received from the base in leading synchronism i.e. the 25 bit frame of the portable unit is before the corresponding frame of the base unit. Normally, just two such sequences will be transmitted by the portable unit: the first interleaved with the third sequence coming from the base unit, and the second interleaved with the fourth sequence coming from the base unit.

During the third sequence of AI frames from the base unit to the portable unit, the first sequence of AI frames sent from the portable unit to the base unit are used by the base unit to establish bit and word synchronism between the base unit's circuitry and the transmission from the portable unit. Once this is established, at least by the end of the third sequence, the base unit will then be in a position to locate the header bits for the identity information being transmitted by the portable unit in its second AI frame sequence, corresponding to the fourth AI sequence from the base unit.

The 4 least significant bits (1 sb) of the ID are used to indicate the hook state (i.e. off or on).

(iv) Base unit response to Portable unit Response (MUX2)

On satisfactorily receiving the portable unit's complete ID the base unit changes the A sub-frame of the AI frame to a B sub-frame, thus making a BI frame. This is illustrated in FIG. 4D. The BI frame is now transmitted for a 7-frame sequence cycling, as before, through the full 28 bits of ID information. The B words, which are different to the A words, signal the end of the MUX2 sequence to the portable unit. Provided that the portable unit is off-hook, the base unit will enter the speech frame mode (MUX1) at the end of these 7 BI frames. Meanwhile, the portable unit responds to the transmitted sequence of BI frames (v) Portable unit Response to Base unit BI frames (MUX2)

The portable unit responds by substituting B for A after it detects the B sub-frames in the base unit call and retransmits these back to the base unit. The portable unit enters speech frame mode at the end of the sequence of 7 BI frames, provided it is off-hook.

(vi) Speech Frame (MUX1)

This is the mode used for speech communication and consists of 24 bits of 32 kbits/sec encoded speech with 1 bit of message or ID data appended (25 bits total). See FIG. 4E. The data stream conveyed by this single bit consists of 7 ID nibbles (of which the east significant (LS) nibble is flap open (base unit) or portable unit hook state, a message nibble and an echo of the received message. Messages are sent continuously until two good echoes in sequence are received then terminators (null messages) are sent until two null echoes are received. A recipient acts on a message when two good consecutive messages have been received and the terminators have been received. False messaging is reduced by inverting the echo if the received signal strength was low during the message frame or there has been an error in the previous ID block. The message rate is one nibble per 27 mS.

Figure 5:
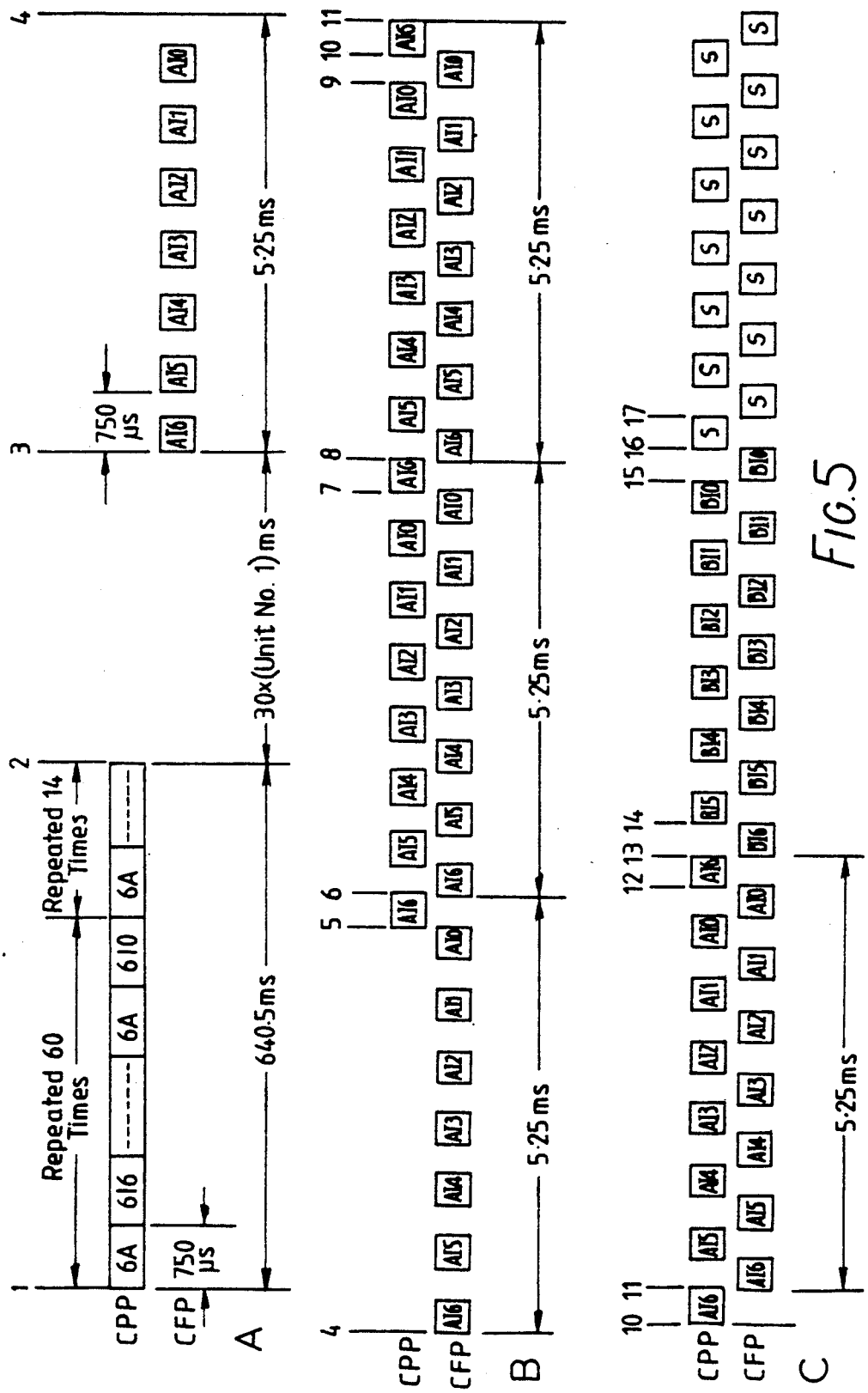
FIG. 5 is a timing diagram summarising the three multiplexes, MUX3, MUX2 and MUX1 shown together as a sequence.

Reference is now made to FIG. 5 which is intended to summarise the above by illustrating the transition from MUX3 to MUX2 to MUX1. Each block in the drawing represents a respective transmission frame 6A, 6A, AI or BI. The upper horizontal line of blocks (marked CPP for "cordless portable part") represents transmission bursts from the portable unit 2 or 3 to the base unit 1. The lower horizontal line of blocks (marked CFP for "cordless fixed part") represents transmission bursts from the base unit 1. The horizontal scale is time, and the three parts A, B and C of the drawing are intended to be read in sequence, starting with A. In order to assist explanation vertical lines numbered from 1 to 17 are used to mark particular positions along the timescale.

Position 1 indicates the start of the MUX3 transmission from the portable unit. The transmission consists of a plurality of sequences, each sequence comprising 6 A frames alternating with 6 I frames. As already mentioned, seven different types of 6 I frames need to be transmitted in order to cater fully for the 28 bit code: in FIG. 5, these different 6 I frames are designated 6I6, 6I5, 6I4, 6I3, 6I2, 6I1 and 6I0. In each sequence, the 6I6 frame, containing the MsB's, are transmitted first. Thus, the order of each sequence is as follows: 6A, 6I6, 6A, 6I5, 6A, 6I4 ... 6A, 6I0.

A total of sixty such sequences are transmitted, followed by a final, sixty-first sequence in which the 6I frames are replaced by 6 A frames. Position 2 marks the end of the 61 st sequence, and the end of MUX3. The total duration of MUX3 is 640.5 mS.

Position 3 marks the start of the base unit transmissions in MUX2. Between positions 2 and 3, the portable unit listens for a response from the base unit, and no transmission is made. In the present example, the portable unit listens for up to 270 mS for a response from the base unit.

MUX2 commences with a full sequence of seven AI frames. As before, the seven different identity frames give rise to corresponding AI frames shown as: AI6, AI5, AI4, AI3, AI2, AI1 and AI0. The transmissions take place within the 750 μs period of ping-pong transmission. During the first sequence the portable unit achieves frame synchronism, probably within the first 750 μs period and will then check subsequent frames for header bits. However, because the set header bit (associated with AI6) will by now already have passed, the header will not in fact be detected until the AI6 frame of the next sequence, immediately after position 4.

Position 4 marks the position of the second sequence of seven AI frames. Between positions 4 and 5, the portable unit will detect the header and complete ID code from the base unit. Immediately after the end of the AI0 frame transmission burst from the base unit, the portable unit begins its transmission of AI6 in ping-pong format. This is shown between positions 5 and 6. Position 5 thus marks the start of the first sequence of seven AI frames transmitted by the portable unit, while position 6 marks the start of the third sequence of seven AI frames transmitted by the base unit. The base unit achieves frame synchronisation with the portable unit transmissions during the first 750 μs period from position 5. The base unit then checks subsequent AI frames for header information. This is not obtained, however, until the beginning of the second sequence of AI frames transmitted by the portable unit (position 7) when the base unit receives the set header bits associated with frame AI6. During this second sequence of transmission bursts from the portable unit, between positions 7 and 9, the base unit receives the full ID code.

Positions 9 to 12 may be summarised as follows:

Position 9 marks the end of the second sequence of transmissions from the portable unit;

Position 10 marks the end of the fourth sequence of transmission bursts from the base unit 3 and the beginning of the third sequence of transmission bursts from the portable unit;

Position 11 marks the beginning of the fifth sequence of transmission bursts from the base unit; and Position 12 marks the end of the fifth sequence of transmission bursts from the base unit and the beginning of the fourth sequence of transmission bursts from the portable unit.

Position 13 marks the beginning of the sixth sequence of transmission bursts from the base unit. This sixth sequence is characterised by the A frame component within the composite AI frame being replaced by a B frame, making a BI frame. A single full sequence of these is transmitted by the base unit between positions 13 and 16.

The portable unit meanwhile immediately detects the change of frame type to BI frame and transmits the remaining part of the fourth sequence with BI frames, instead of AI frames—see position 14. Position 15 marks the end of the fourth sequence of transmission bursts from the portable unit. Position 16 marks the end of the sixth sequence of transmission bursts from the base unit, and the beginning of the first speech frame S from the portable unit. Position 17 marks the first speech frame S from the base unit. Transmission now continues in MUX1, with alternate exchanges of speech frames within the 750 μs ping-pong format.

Thus far we have considered only the setting up of outgoing calls from the portable unit to the base unit and onward. We now consider incoming calls arriving at the base unit and to be communicated to one of the portable units.

Initial call from Base Unit (MUX2)

Since the base unit can only operate within the ping-pong framework, a continuous call signal of the MUX3 type cannot be used. The base unit therefore goes straight to MUX2 and transmits a series of sequences of 7 AI frames. Each sequence of 7 AI frames will contain the identity code of one of the associated portable units. A group of four such identical sequences are transmitted. The basic call repeat time is thus $4 \times 7 \times 25 = 700$ bits (21 mS).

Next a further group of four identical sequences of 7 AI frames are transmitted which are the same as the first group, but in which the identity information in the I words is changed to be that of another of the associated portable units. In this way, the base unit cycles round the portable units, sending a group of 4 complete sequences of 7 AI frames each time, until one of the portable units responds. The first portable unit to respond will get the call.

The portable units, when listening for a call from the base unit will listen in the ping-pong format in discrete reception windows. As soon as a recognisable A word is received, the portable unit starts the operation necessary to make contact. This is done in the same way as already described for MUX2—in other words, in the first of the group of four AI frame sequences received from the base unit, the portable unit will endeavour to achieve bit and word synchronism with the base unit, and in the second of the sequences, the identity will be checked. If the identity is not correct, the portable unit will take no further action, if it is correct, the portable unit will reply with its own two sequences of seven AI frames interleaved with the third and fourth sequences respectively of the group of four sent by the base unit. The base unit then synchronises upon reception of the first of these two sequences, and checks identity upon receipt of the second, before finally sending a single sequence of BI frames, signalling the end of MUX2, and transferring to MUX1 (speech mode)—see above.

RECOVERY FROM SIGNAL LOSS

Signal loss is handled by two mechanisms.

(i) Audio Control

The audio gain is reduced if the signal even drops below a predetermined offset from the noise floor. This is temporary. The audio is muted if speech mode has to be abandoned.

(ii) Synchronism Recovery (MUX2)

Loss of synchronism of assumed when substantial ID errors have existed for about 100 mS and is signalled to the other end by inverting the next 4 IDs. Speech mode is then abandoned and the base calls the portable in a non-ringing mode on the current channel for 3 seconds. If no contact results a fresh channel is sought and the base unit calls for a further 3 seconds on this new channel. If no contact results by the end of this period the base goes off line and the portable unit indicates link failure.

The circuitry used to provide the above signals may take many forms. The following is a description of the circuitry we have used to realise the above-described exchange of signals, and is to be considered exemplary only.

Reference is first made to FIGS. 6 and 7 which shows the sub-systems used in the base unit 1 (FIG. 6) and each of the portable units 2, 3 (FIG. of FIG. 1. As can be seen from a brief review of FIGS. 6 and 7, much of the circuitry is common as between the base unit and each of the portable units. In both cases a microprocessor 30, 40 controls a proprietory logic chip 31, 41 which in turn interfaces to the RF section. The RF section comprises a transmitter 32, 42, and receiver 33, 43, both connected to an antenna 5, 6/7. Frequency control is by means of a frequency synthesiser 34, 44. Also interfaced to the logic chip 31, 41 is an audio processing chip 35, 45. In the base unit the audio chip is interfaced to the external connection 10 by means of a PSTN interface unit 36. In each of the portable units, the audio chip interfaces to the audio transducers: earpiece 46 and microphone 47. Power is supplied in the base unit by a power supply 37 and in the portable units by a battery 48. For the sake of clarity, the power supply connections are omitted.

The portable units have, in addition, a circuit element 49 for serial number assignment (ID code), and a switch circuit element 50 for signalling such things as flap open (indicating whether or not the unit is active), battery compartment cover, and state of charge of battery. The user keypad 4 is connected to the microprocessor 40.

The data frames exchanged in the above-described protocols are generated by the logic chip 31, 41. Unaided, this will generate one static frame type repeatedly; software control is used to generate the sequences of frames used in the signalling protocol. Fixed characteristics, such as the lengths of the data frames, the positions of the various fields, and the format of the A and B sub frames are generated by the logic chip. Variable characteristics, carrying changeable information, such as the I sub frames and the speech frame data bits are supplied to the logic chip by the microprocessor 30, 40 on a frame-by-frame basis. Similarly, received data fields have to be read by the microprocessor on a frame-by-frame basis.

An example of suitable circuitry for frame generation and reception will now be described. The circuit is applicable to both base unit and portable unit, and incorporates elements to alter the method of operation as between these units, where appropriate.

FIG. 8 shows the transmit circuit. This generates the transmitted data stream (TXD) which is applied to the RF modulator (not shown), together with various control signals for the RF circuitry. Timing is derived from a crystal master oscillator 50. This is divided down in a divider 51 to generate CCK, a 32KHz clock signal for a speech encoder 54, and TCK, an 80KHz clock signal for the remainder of the transmit circuit. Signal TCK is applied to a bit counter 52 which counts the bits in a ping-pong frame. This counts in BCD and runs from 0 to 59. When the counter is at 0, the transmit circuit is in the process of generating the first bit (bit 0) of the transmit frame. Gates within a bit decoder block 53 generate several signals which become active at particular values of the bit counter; these are designated TBITn. For example TBIT59 is high while the counter is at 59, etc. These signals are used in the remainder of the circuit. One such signal is used as a 'sync out' signal which may be used to synchronise links within multiple linked base units. A corresponding 'sync in' pin is present and is used on slave devices. A positive edge on this pin resets the CCK and TCK dividers 51, and the bit counter 52. In a portable unit, the transmitter is synchronised to the received data, and multiplexer 55 selects a signal from the unit's receiver as the sync source.

The transmit circuitry is controlled via eleven signals from a microprocessor interface block 56. These are retimed by a latch 57 so that changes of mode occur only at the beginning of a new frame. Five of the signals from the microprocessor interface block set the data to be transmitted in the I sub frames. These pass to a multiplexer 58 which generates I sub frames every 10 bits by selecting each input in sequence. The line 59 used to set the header bit h is also used to set the speech frame data bit and passes to a multiplexer 60. A control signal ANB (A not B) selects whether A or B sub frames are to be generated. This is passed to a multiplexer 61 which generates the A/B sub frames in a similar fashion to the I sub frames, and passes them to a multiplexer 62.

Of the remaining control signals, MUXL and MUXM select the required multiplex, TXON indicates whether transmission is enabled, HIPEN selects full transmission power, and FNP indicates base unit or portable unit.

Gates 60, 62, 63, 64 and 65 select the appropriate data streams and sub frames to make up the data stream for the various multiplexes MUX 1, 2 or 3. Multiplexer 62, controlled by multiplexer 63, selects A/B or I sub frame. Exclusive OR gate 64 performs the periodic inversion of these sub frames, controlled by a flip-flop 66 and gates 67–69. Multiplexer 65 switches between the A/B/I call setup sub frames, and the speech mode data stream. Multiplexer 60 inserts the single speech mode data bit into the speech stream. Speech data at 32KB/s passes from the speech encoder 54 to a first-in/first-out (FIFO) buffer 70. During a speech frame, 24 bits are clocked out of the FIFO buffer 70 at 72KB/s, under the control of a flip-flop 71 and gate 72.

Transmitter control signals are derived from blocks 73–79. Flip-flop 73 and gate 74 generate the basic transmit period. This is either a 25 bit long pulse for ping-pong frames, or continuous for MUX3. This passes through gate 75 if transmission is enabled, and into shift register 79. Gated taps from this (76–78) produce the control signals which gate the transmitted data in a gate 81. The transmitted data is retimed and delayed by a shift register 80 so as to be in the correct relationship to the control signals.

FIG. 9 shows the front end of the receive circuit. This takes the sliced data from the receiver RF section at input terminal 90, synchronises an internal 72KHz clock to it, and produces clean data retimed by the clock. Timing is derived from the same master oscillator 50 as the transmitter. Divider 91 produces from this a clock at 30 times the data rate (i.e. 2.4MHz). Counter 92 normally divides by 30, giving the nominal data rate out on signal line RCK. If it is required to advance the phase of the clock to track the incoming data, then it may periodically be set to divide by 29 for one count, reducing the clock period temporarily. Similarly, the phase may be retarded by periodically dividing by 31. This is explained in more detail below.

Within each count period, four samples are taken of the received data by flip-flops 91 to 94. These occur at times within the bit selected by decoding, in a decoder 95, various counts of the 3 modulus counter 92. These are arranged to occur at the expected position of the boundary between bits, the middle of the bit, and two samples 20% of a bit either side of the center (pre-mid and post-mid). The three samples pre-mid, mid, and post-mid are majority voted on by gates 96 to 99 and the result is retimed by flip-flop 100 giving the retimed data signal (RD). Majority voting gives extra immunity to jitter and noise.

Synchronisation of the clock in MUX2 is achieved by looking for transitions in the input data, and when they occur checking whether they occurred before or after the expected transition point. This is done by comparing the previous majority voted bit (from flip-flop 100), the present majority voted bit (from gate 99), and the boundary sample from flip-flop 94. From these, two indications are derived, early on line 101 and late on line 102, which are applied to flip-flops 106, 107 respectively. Only one of these lines will be active, and if there is no transition (i.e. 2 identical successive bits) then neither will be active.

When initiating communication, counter 103 is bypassed by a multiplexer 104, and the early and late signals directly control the three modulus counter 92. Thus any data transition will cause the clocks to shift in one direction or the other by 1/30 bit. This allows fast acquisition of bit synchronism. Once frame lock has been achieved, the rate of phase shift is reduced to give improved immunity to noise and fading. This is achieved by inserting counter 103 between the early-/late detector and the three modulus counter 92. This counter starts at its middle value and counts up for early events and down for late transitions. Only when the counter reaches $+/-15$ is the 3 modulus counter 92 set to 29 or 31 for one period. Gate 105 also presets the 5 bit counter to its mid value again. This slows the maximum phase slew rate by a factor of 15.

FIG. 10 shows the back end of the receiver circuitry. This takes the retimed data and clock signals and extracts the various sub frames and data streams. A and B sub frames are used to gain frame lock, as they occur at known positions in the bursts. Presence of A and B frames is signalled to the microprocessor by means of readable flags. I frame data is extracted and made available to the microprocessor, as is the speech frame data bit. These must be read each frame if data is not to be lost. Speech data is sent to the receive FIFO 110 in 24 bit bursts at 80KB/s, and is read continuously at 32KB/s into the speech decoder.

The receive clock signal RCK is used to drive a receive bit counter 111, and most of the rest of the receive circuit. As with the transmitter, a number of bit n signals are derived by decoding particular counts in a bit n decoder 112. One of these is used to synchronise the transmitter to the received data in handset applications.

Once bit synchronism has been achieved, the next step is to gain frame lock by recognition of an A or B sub frame. One of these is selected as the sync word by the microprocessor via line RXANB. The retimed data passes into a 9 bit shift register 113. The 10 bits are compared with the bit patterns for the A and B sub frames by means of gates 114 to 117. If the type selected by multiplexer 118 occurs in either true or inverted form then flip-flop 119 is set, indicating that framelock has been achieved, and the bit counter 111 is set to 10 (as the next bit of the frame will be bit 10). Framelock is passed to the MPU interface 120 as a flag. If this first key frame was an inverted one, then a flip-flop 121 is toggled to correct the polarity of following A/B and I data. For MUX3, no further toggling should occur; flip-flop 121 is only toggled if a perfect key of the wrong polarity is received. In MUX2, successive AI or BI pairs are of opposite polarity, so flip-flop 121 toggles every frame unless a perfect key of the wrong polarity is received. These functions are implemented by gates 122, 123, 124 and 125. Gates 126, 127 ensure that after the initial acquisition of frame lock, only A and B patterns in the correct position in the frame affect the polarity of flip-flop 121.

At the end of the receive frame, latch 128 is set by the signal TBIT5. This is an indication that received data may be read from the registers (and that new data may be written to the transmitter). A transmit signal is used, as this will occur at regular intervals in a base unit. Gates 129, 130 allow the A and B indications latched by flip-flop 131 to cause setting of register bits when the timeout occurs. Reading the register clears the three indications until the next timeout. Latch 132 samples retimed data RD and four of the outputs of shift register 113 at the appropriate time to pick out the received I data. It is clocked on bit 9 for a 6I frame and a bit 19 for an AI/BI frame as selected by multiplexer 133. As with the A and B flags, this is further retimed by flip-flop 134 so that the register indications change at the timeout. In speech frame mode, flip-flop 135 latches the data bit at the end of the frame, and this is inserted in place of the header bit by multiplexer 136.

The 24 speech bits in each MUX1 frame are clocked into the FIFO 110 by gate 137 and flip-flop 138, and pass from there to the speech decoder. The decoder shares the encoder's clock signal CCK. Signal VBIT is generated by flip-flop 140 and gates 141, 142 and is high during valid receive bits. This is used to enable the bit synchroniser and the A/B detector. A portable unit which has not gained frame lock is able to receive continually, and VBIT would remain high. Once locked, VBIT will only be high for the duration of the received bursts. A base link is assumed to be part of a multi-link base, and its TX period signal TXPER will pulse high during the transmit slot even if its own transmitter is not enabled. Vbit is always set to 0 when TXPER is high by gate 142. This prevents bitsynch and framelock being affected by adjacent links.

We claim:

1. A method of establishing a digital time-division duplex radio communication link between one of a plurality of portable units and a base unit forming a cordless telephone system, said radio link being normally effected by a ping-pong format comprising alternate bursts of transmitted signal and reception with one end of the link transmitting while the other is receiving, and wherein the base unit includes a number of transceivers at least equal to the number of portable units, and each portable unit includes a transceiver whereby the aforesaid radio link may be established, said method comprising synchronising the transmission bursts from each of the active base transceivers so that they all have the same start time and burst duration and defining, between successive synchronised transmission bursts, a reception window during which the base unit transceivers are in a reception mode to listen for signals from the portable units.

2. A method as claimed in claim i wherein, to commence the establishment of a call, one particular portable unit transmits a continuous digital call signal consisting of multiple repeats of identity and synchronising data arranged in units which are of sufficiently small duration to be wholly within the reception window of the base unit.

3. A method as claimed in claim 2 wherein there are two basic types of unit: a first type of unit containing call data operable to inform the base unit that a call is to be made and synchronising data operable to enable synchronism as between the transmissions of the respective transceiver in the base unit and those of the transceiver in the portable unit to be effected; and a second type of unit containing information for identifying which particular portable unit is making the call.

4. A method as claimed in claim 3 wherein units of data of the first type are transmitted alternately with units of data of the second type.

5. A method as claimed in claim 4 wherein multiple identical units of said first type are transmitted alternately with multiple identical units of said second type.

6. A method as claimed in claim 5 wherein said base unit transceiver looks, during its reception windows, for data units of said first type and, when it has fully received a data unit of said first type from one of the portable units, looks for a data unit of said second type in a subsequent reception window.

7. A method as claimed in claim 6 wherein, in order to obtain complete information as to the identity of the portable unit making the call, it is necessary for the base unit to receive a plurality of data units of said second type in subsequent reception windows.

8. A method as claimed in any one of claims 3 to 7 wherein, at the termination of the continuous call signal, the portable unit and base unit revert to the ping-pong format of alternate transmission and reception and thereby exchange synchronising and identity information to establish synchronism between the transmissions of the portable unit and the base unit and to confirm the identity of the portable unit before reverting to a speech mode in which speech signals rather than data signals are exchanged between the portable unit and base unit.

9. A method as claimed in claim 8, therein the exchange of synchronising and identity information commences with the base unit sending to the portable unit a transmission burst consisting of a data frame containing at least a data unit of said first type and a data unit of said second type.

10. A method as claimed in claim 9 wherein, in a case where the complete identity information is contained in a plurality of data units of said second type, a sequence of said data frames are sent by the base unit sufficient to fully transmit the identity information.

11. A method as claimed in claim 10 wherein each transmission burst of the base unit is sufficiently long to contain at least one said data frame, and wherein a plurality of identical said sequences of data frames, are sent in subsequent transmission bursts.

12. A method as claimed in claim 11 wherein, upon receiving the first sequence of data frames from the base unit, the portable unit synchronises its own circuitry with the base unit transmissions and in the second sequence checks the identity code sent by the base unit and thence, if the identity code corresponds to a predetermined identity code, starts to transmit back to the base unit in bursts located in the time periods between the transmission bursts of the base unit, said transmission bursts comprising a data frame identical to that just received from the base unit, and in leading synchronism therewith.

13. A method as claimed in claim 12 wherein the base unit, upon receiving the first of the return sequences sent by the portable units synchronises its circuits with the portable unit transmissions and, upon receiving the second of the return sequences checks the identity of the portable unit sending the signal and, if the identity of the portable unit sending the signal corresponds to a predetermined identity, reverts to the speech mode.

14. A method as claimed in claim 1 wherein, for the purpose of transferring an incoming call from the base unit to one of the portable units, the base unit sends a transmission burst, within the ping-pong format, consisting of a data frame containing a data unit of a first type containing call data operable to inform the portable units that a call is to be made and synchronising data operable to enable synchronism as between the transmissions of the respective transceivers in the base unit and those of the transceivers in selected ones of the portable units, and a data unit of a second type containing information as to the identity of a respective one of said portable units.

15. A method as claimed in claim 14 wherein a series of data frames are sent, said data frames being identical, except that subsequent frames may contain identity information for different ones of said portable units so that, over a period, all the portable units are scanned for a response.

16. A method as claimed in claim 15 wherein, in order to transmit complete information as to the identity of each of the portable units, it is necessary for the base unit to transmit a sequence of said data frames sufficient to fully transmit the identity information.

17. A method as claimed in claim 16 wherein each transmission burst of the base unit is sufficiently long to contain at least one said data frame, and wherein a plurality of identical said sequences of data frames, are sent in subsequent transmission bursts.

18. A method as claimed in claim 17 wherein, upon receiving the first sequence of data frames from the base unit, the portable unit synchronises its own circuitry with the base unit transmissions and in the second sequence checks the identity code sent by the base unit and thence, if the identity code corresponds to a predetermined identity code, starts to transmit back to the base unit in bursts located in the time periods between the transmission burst of the base unit, said transmission bursts comprising a data frame identical to that just received from the base unit, and in leading synchronism therewith.

19. A method as claimed in claim 18 wherein the base unit, upon receiving the first of the return sequences sent by the portable units synchronises its circuits with the portable unit transmissions and, upon receiving the second of the return sequences checks the identity of the portable unit sending the signal and, if the identity of the portable unit sending the signal corresponds to a predetermined identity, reverts to the speech mode.

20. A cordless telephone system comprising at least two portable units and a base unit, each of said portable units and base unit incorporating transceiver means whereby a digital time-division duplex radio link may be selectively established between each said portable unit and said base unit, communication within each link being established by means of alternate bursts of transmitted signal and reception, with one end of the link transmitting while the other is receiving, said system being characterised in that means are provided at the base unit for synchronising the transmission bursts from each of the active base transceivers so that they all have the same start time and burst duration and means are provided at the base unit for defining, between successive synchronised transmission bursts, a reception window during which the base unit transceivers are in reception mode to listen for signals from the portable units.

21. A method as claimed in claim 3 wherein the exchange of synchronizing and identify information commences with the base unit sending to the portable unit a transmission burst consisting of a data frame containing at least a data unit of said first type and a data unit of said second type.

* * * * *